(12) United States Patent
Cowperthwaite et al.

(10) Patent No.: US 7,644,407 B2
(45) Date of Patent: Jan. 5, 2010

(54) METHOD, APPARATUS AND SYSTEM FOR SEAMLESSLY SHARING A GRAPHICS DEVICE AMONGST VIRTUAL MACHINES

(75) Inventors: David J. Cowperthwaite, Hillsboro, OR (US); Michael A. Goldsmith, Lake Oswego, OR (US); Kiran S. Panesar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1242 days.

(21) Appl. No.: 10/794,914

(22) Filed: Mar. 5, 2004

(65) Prior Publication Data

US 2005/0210158 A1  Sep. 22, 2005

(51) Int. Cl.
*G06F 9/46* (2006.01)
*G06F 9/26* (2006.01)
*G06F 3/00* (2006.01)

(52) U.S. Cl. .......................... 718/1; 715/700; 711/203; 711/206

(58) Field of Classification Search ...................... 718/1; 711/203, 206; 715/700
See application file for complete search history.

(56) References Cited

U.S. PATENT DOCUMENTS

| | | | | |
|---|---|---|---|---|
| 5,317,705 A | * | 5/1994 | Gannon et al. .............. 718/100 |
| 5,696,970 A | * | 12/1997 | Sandage et al. ............. 719/324 |
| 5,903,752 A | * | 5/1999 | Dingwall et al. ............ 718/103 |
| 6,075,938 A | * | 6/2000 | Bugnion et al. ............... 703/27 |
| 2006/0282253 A1 | * | 12/2006 | Buswell et al. ............... 703/22 |

* cited by examiner

*Primary Examiner*—Meng-Ai An
*Assistant Examiner*—Kenneth Tang
(74) *Attorney, Agent, or Firm*—Joni D. Stutman

(57) ABSTRACT

A method, apparatus and system are described for seamlessly and concurrently sharing a graphics device amongst multiple virtual machines ("VMs") on a host computer. Specifically, according to one embodiment of the invention, a graphics device may be shared by multiple VMs such that only the output of one VM (i.e., the "focus VM") is displayed on a display device coupled to the host computer. The focus VM may be identified according to a variety of ways. The focus VM may render its output into a frame-buffer and/or an overlay buffer, and the page table entries ("PTEs") that point to the frame-buffer may then be copied to a display buffer in an unused memory location associated with the focus VM. The PTEs may additionally be copied to display buffers in unused memory locations associated with the non-focus VMs on the host. The display buffer may then output its display (via the pointers to the frame buffers) to the display device. This output remains that of the focus VM until a different VM is selected as the new focus VM. The process may then repeat itself.

28 Claims, 6 Drawing Sheets

METHOD, APPARATUS AND SYSTEM FOR SEAMLESSLY SHARING A GRAPHICS DEVICE AMONGST VIRTUAL MACHINES

CROSS-REFERENCE TO RELATED APPLICATION

The present application is related to U.S. patent application Ser. No. 10/794,752, now issued as U.S. Pat. No. 7,454,756, entitled "Method, Apparatus and System for Seamlessly Sharing Devices Amongst Virtual Machines," assigned to the assignee of the present invention (and filed concurrently herewith).

BACKGROUND

Interest in virtualization technology is growing steadily as processor technology advances. One aspect of virtualization technology enables a single host computer running a virtual machine monitor ("VMM") to present multiple abstractions and/or views of the host, such that the underlying hardware of the host appears as one or more independently operating virtual machines ("VMs"). Each VM may function as a self-contained platform, running its own operating system ("OS") and/or a software application(s). The VMM manages allocation of resources on the host and performs context switching from one VM to another as necessary to cycle between various virtual machines according to a round-robin or other predetermined scheme.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention provide a method, apparatus and system for seamlessly sharing a graphics device amongst virtual machines ("VMs"). More specifically, embodiments of the present invention enable multiple VMs to share direct access to a graphics device. Reference herein to "graphics devices" shall include add-in graphics accelerator cards (e.g., cards compatible with various versions of Peripheral Control Interconnect ("PCI"), PCI Express, Accelerated Graphics Port ("AGP"), etc.) as well as devices integrated into the host computer's hardware (e.g., the host memory controller). Additionally, reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

Figure 1:
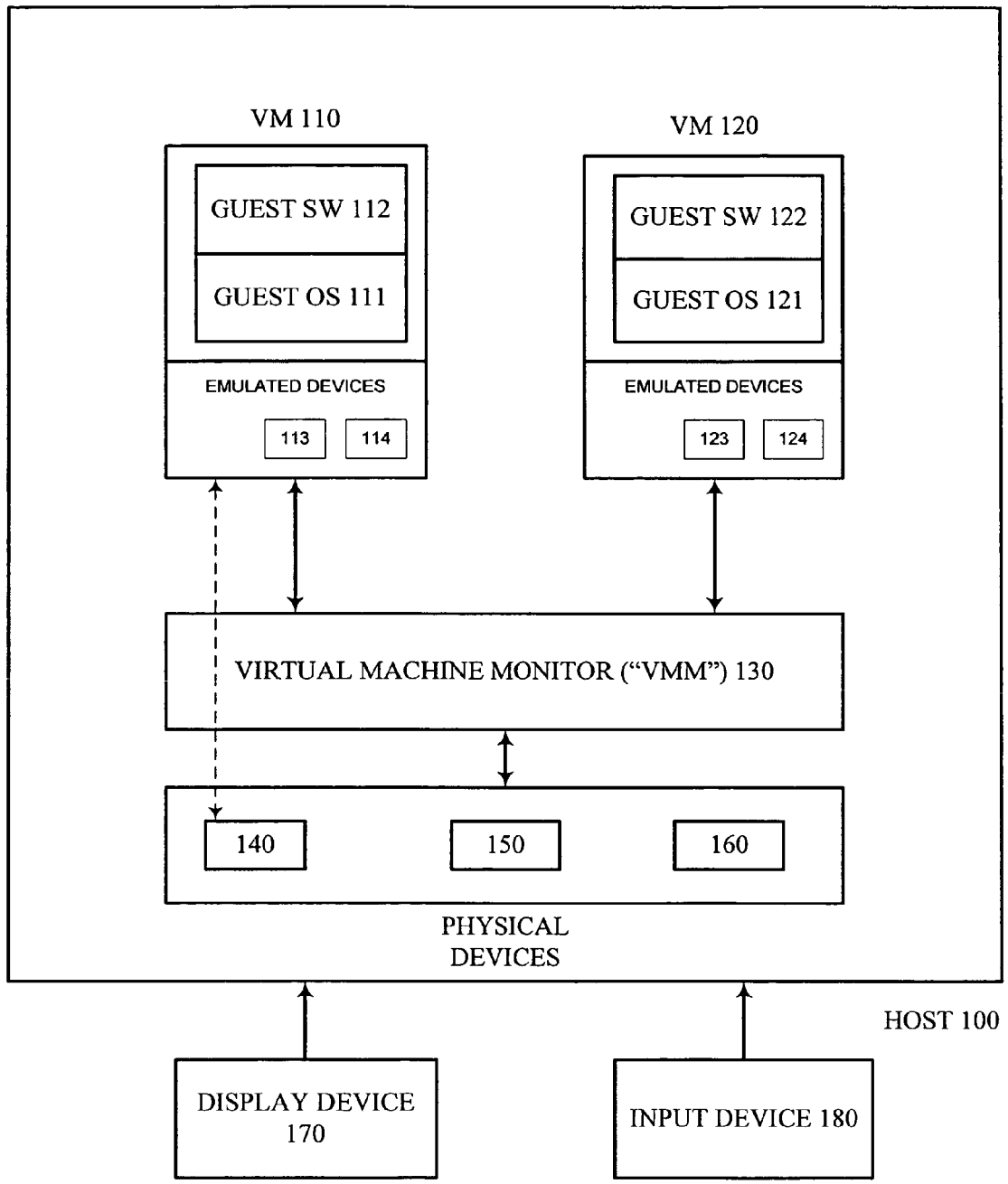
FIG. 1 illustrates an example of a typical virtual machine host.

FIG. 1 illustrates an example of a typical virtual machine host platform ("Host 100") having one or more display devices (collectively illustrated as "Display Device 170") and input devices such as a keyboard and/or mouse (collectively illustrated as "Input Device 180"). As previously described, a virtual-machine monitor ("VMM 130") typically runs on the host platform and presents an abstraction(s) and/or view(s) of the platform (also referred to as "virtual machines" or "VMs") to other software. Although only two VM partitions are illustrated ("VM 110" and "VM 120", hereafter referred to collectively as "Virtual Machines"), these Virtual Machines are merely illustrative and additional virtual machines may be added to the host. VMM 130 may be implemented in software (e.g., as a standalone program and/or a component of a host operating system), hardware, firmware and/or any combination thereof.

VM 110 and VM 120 may function as self-contained platforms respectively, running their own "guest operating systems" (i.e., operating systems hosted by Enhanced VMM 230, illustrated as "Guest OS 111" and "Guest OS 121" and hereafter referred to collectively as "Guest OS") and other software (illustrated as "Guest Software 112" and "Guest Software 122" and hereafter referred to collectively as "Guest Software"). Each Guest OS and/or Guest Software operates as if it were running on a dedicated computer rather than a virtual machine. That is, each Guest OS and/or Guest Software may expect to control various events and have access to hardware resources on Host 100. In reality, Enhanced VMM 230 has ultimate control over the events and hardware resources and allocates resources to Guest OS and/or Guest Software as necessary.

Various physical devices ((illustrated conceptually in FIG. 1 as Physical Devices 140, 150, and 160) may also be coupled to Host 100. Allocation of the physical devices to the various Virtual Machines is managed by VMM 130. Currently, VMM 130 may allocate the physical devices to the Virtual Machines by giving a specific Virtual Machine exclusive access to a physical device (e.g., Physical Device 140 to VM 110, as illustrated) and/or by creating and maintaining software instantiations of the physical devices (i.e., emulating the devices) for each of the Virtual Machines. In the former situation, Physical Device 140 is accessible only by VM 110 and is not available to the other Virtual Machines on Host 100 without restarting Guest OS 111 and Guest OS 121 on Host 100.

If a physical device on Host 100 is going to be shared by more than one Virtual Machine at the same time, VMM 130 typically emulates the physical device (i.e., implements a software "copy" of the device for each Virtual Machine), and arbitrates access of the emulated devices to the physical device. In other words, VMM 130 may enable multiple emulated ("virtual") instantiations of the devices, thus allowing each Virtual Machine to seem to have direct access to some set of devices (illustrated conceptually in FIG. 1 as Emulated Devices 113 and 114 on VM 110, corresponding to Physical Device 150 and 160, and Emulated Devices 123 and 124 on VM 120, also corresponding to Physical Device 150 and 160). Although in reality, the Virtual Machines do not have direct access to and/or control of the devices, VMM 130 may manage access to the physical devices according to some predetermined scheme such that the Guest OS and Guest Software in the Virtual Machines are unaware of their lack of direct interaction with the physical devices.

Both schemes described above suffer from a number of limitations. In the former situation where a single Virtual Machine has exclusive access to Physical Device 140, only that Virtual Machine may have access to the device and reallocating the device to another Virtual Machine is a complex task. In the latter situation where emulated devices are provided by VMM 130, the abstraction may increase the overhead and noticeably decrease the performance of Host 100 and/or Physical Device 140. This performance degradation may be crucial for certain types of devices coupled to Host 100. Additionally, due in part to the complexity of emulating in software the various functionality of hardware devices, the software-emulated devices implemented by VMM 130 may have fewer features than the physical device. For example, VMM 130 may implement a software-emulated graphics device that supports only Video Graphics Array ("VGA") capabilities, whereas the physical graphics device may additionally support 2 Dimensional ("2-D") and 3 Dimensional ("3D") rendering in hardware.

Figure 2:
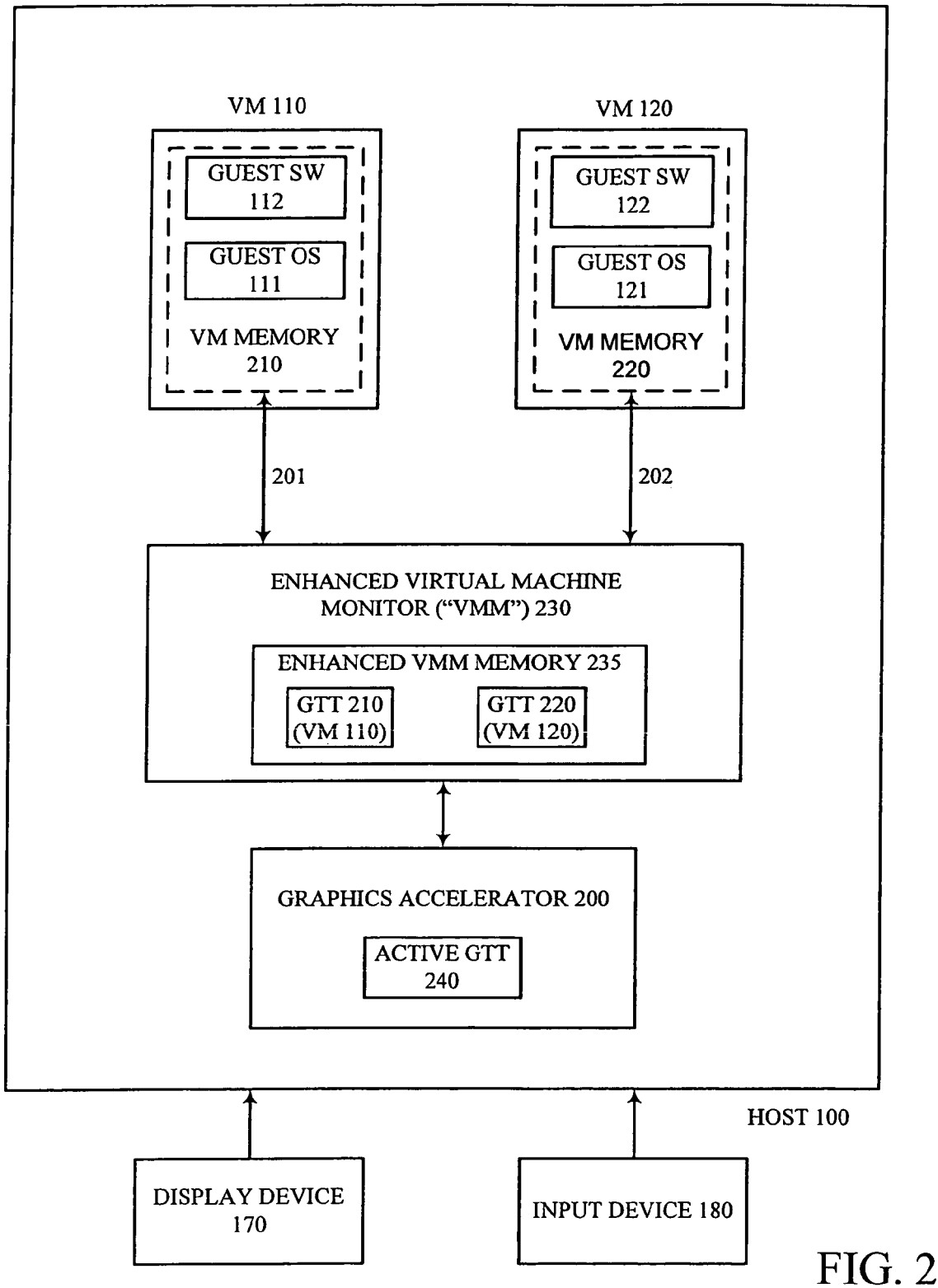
FIG. 2 illustrates a system according an embodiment of the present invention.

According to an embodiment of the present invention, multiple Virtual Machines on a host may directly access and share the full functionality of a single graphics device. FIG. 2 illustrates a system according to an embodiment of the present invention. As illustrated, Enhanced VMM 230 may manage access to Graphics Accelerator 200 such that each Virtual Machine on Host 100 may directly access the device. Additionally, Enhanced VMM 200 may manage the display output from the Virtual Machines to ensure the output is viewable. The term "Enhanced VMM 230" shall include a VMM enhanced to enable various embodiments of the present invention as described herein. It will be readily apparent to those of ordinary skill in the art that the enhancements may be made to an existing VMM and/or to other elements that may work in conjunction with the VMM. Enhanced VMM 230 may therefore be implemented in software (e.g., as a standalone program and/or a component of a host operating system), hardware, firmware and/or any combination thereof.

Each Virtual Machine may be allocated a portion of Host 100's memory for use by the Guest OS and Guest Software (e.g., as illustrated in FIG. 2, "VM Memory 210" may be assigned to VM 110 and "VM Memory 220" may be assigned to VM 120"). Additionally, Enhanced VMM 230 may also be allocated an area of memory on Host 100 (illustrated in FIG. 2 as "Enhanced VMM Memory 235"). In one embodiment, Enhanced VMM 230 may associate portions of Enhanced VMM Memory 235 to specific Virtual Machines to enable storing and/or retrieval of the execution state information for Graphics Accelerator 200.

To enable direct, shared access to a Graphics Accelerator 200, Enhanced VMM 230 may preserve the execution context of Graphics Accelerator 200 (i.e., the state of control registers, graphics page translation tables, frame buffers, etc.) for each Virtual Machine that may access Graphics Accelerator 200. Thus, for example, if VM 110 is currently executing on Host 100 and VM 120 is scheduled to begin execution, the graphics device state for VM 110 may be saved to a region of memory on Host 100 associated with VM 110 (i.e., a portion of Enhanced VMM Memory 235 allocated to VM 110) while the graphics device state for VM 120 may be loaded from its assigned region of memory on Host 100 (i.e., the portion of Enhanced VMM Memory 235 where it was previously saved). For the purposes of this specification, the term "memory" may comprise Host 100's cache, main memory and/or hard disk and/or memory resident on Graphics Accelerator 200. VM 120 is thereafter current (i.e., loaded) on Graphics Accelerator 200 and may resume executing graphics commands within its newly retrieved graphics context.

According to one embodiment, sharing Graphics Accelerator 200 directly amongst multiple Virtual Machines may result in an unusable display on Display Device 170. Since the entire state of Graphics Accelerator 200 may be swapped with each Virtual Machine switch, as each Virtual Machine's context is activated, the contents of the Virtual Machine's display buffer may appear immediately on Display Device 170. Since Enhanced VMM 230 may rapidly swap from one Virtual Machine to another (in the order tens of milliseconds) to ensure that each Virtual Machine is able to display its output, the visual result on Display Device 170 may be a rapid, flickering superposition of output from all Virtual Machines. This rapid flickering of images may render the output from Graphics Accelerator 200 useless.

Thus, according to one embodiment of the present invention, the graphics display functionality of Graphics Accelerator 200 may be decoupled from the graphics rendering functionality of Graphics Accelerator 200. More specifically, the output of the Virtual Machines to Display Device 170 may be managed according to a predetermined scheme to address the above-described display difficulties. In one embodiment, the predetermined scheme includes mapping the output of a Virtual Machine to Display Device 170 only when that Virtual Machine is deemed to be the "focus" VM (hereafter "Focus VM"), i.e., the Virtual Machine whose output is currently selected for display on Display Device 170. Thus, for example, if VM 110 currently is selected for display (e.g., Input Device 180 is assigned to it, VM 110's frame buffers are selected for output according to a predetermined scheme, and/or other such selection mechanism), the output of VM 110 may be mapped to Display Device 170 because VM 110 is likely to be the Virtual Machine with which Host 100's operator is interacting. The output from VM 120, on the other hand, will not be displayed on Display Device 170 until Input Device 180 is assigned to VM 120, which likely indicates that Host 100's operator has switched his or her interest to VM 100. Although the Focus VM is described herein only with respect to the VM which has Input Device 180 assigned to it, embodiments of the invention are not so limited. Instead, in other embodiments, various other criteria may be implemented to identify a Virtual Machine as a Focus VM whose output should be displayed on Display Device 170. For example, in one embodiment, Enhanced VMM 230 may select specific frame buffers whose output should be displayed to Display Device 170. This embodiment may be especially useful certain situations, e.g., if Display Device 170 comprises more than one display device, Enhanced VMM 230 may select different frame buffers (i.e., outputs from different Virtual Machines) to output to each display device.

In one embodiment, Graphics Accelerator 200 may belong to the family of graphics devices known as "Unified Memory Devices" that typically utilize the host computer memory as graphics memory. Unified Memory Device employ a Graphics Translation Table ("GTT 210") which includes an array of Page Table Entries ("PTEs") that maps the graphics memory space (i.e., the memory allocated to Graphics Accelerator 200) to the address space of physical memory on Host 100 ("host physical memory"). Thus, although the physical main memory on Host 100 may be fragmented, GTT 210 may be utilized by Graphics Accelerator 200 to create a linearly addressed graphics memory space from these fragmented regions. Graphics Accelerator 200 may have no dedicated local graphics memory, but embodiments of the present invention are not so limited. Instead, alternate embodiments of the invention may be practiced with other classes of graphics devices that do employ dedicated local memory exclusively or in conjunction with main host memory.

In one embodiment, each Virtual Machine on Host 100 is assigned a region of memory in which the frame-buffers and the physical memory backing GTT 210 reside. Generally speaking, there are two logical "partitions" to Graphics Accelerator 200, namely the "render" partition and the "display" partition. The rendering partition of the device handles the execution of graphics instructions and the generation of the contents of the frame-buffer. The display partition of the device handles the scan-conversion of the contents of the frame-buffer for display on Display Device 170. This partitioning of Graphics Accelerator 200 means that the rendering engine may be directed to render into one region of memory while the other partition is displaying from another. This mechanism is typically employed in "double-buffered" output of 3-D graphics.

In one embodiment of the present invention, the predetermined scheme to manage the output of various Virtual Machines to Display Device 170 ensures that the output from the Focus VM is maintained on Display Device 170 until Host 100's operator indicates a desire to switch the Focus VM (e.g., by switching Input Device 180 to another Virtual Machine). The Focus VM may write changes to Active GTT 240 on Graphics Accelerator 200 through a memory-mapped register region on the device. The information may then be propagated to GTT 210 and/or GTT 220 as appropriate. Thus, for example, if VM 110 is the Focus VM, Active GTT 240 represents the contents of GTT 210 and all changes written to Active GTT 240 may be propagated to GTT 210. To ensure that the output from the Focus VM is maintained on Display Device 170, Enhanced VMM 230 may copy the PTEs in GTT 210 that represent the frame-buffer(s) of the Focus VM to a second, unused, region of GTT 210 (i.e., at a predetermined offset). Enhanced VMM 230 may also map these PTEs to the same offsets in the GTTs of the other Virtual Machines on Host 100 which share Graphics Accelerator 200 as a resource (e.g., GTT 220).

In one embodiment, Enhanced VMM 230 may point the register used to indicate the location of the frame-buffer to display to this remapped location, and the contents of this register may be preserved across changes in the state of Graphics Accelerator 200 as Enhanced VMM 230 shares other resources (e.g., the CPU) on Host 100 amongst various Virtual Machines. As a result, the contents of the frame-buffer displayed on Display Device 170 may remain that of the Focus VM, even when another Virtual Machine is currently executing and submitting commands to Graphics Accelerator 200. Other Virtual Machines (i.e., the non-Focus VMs) may continue to submit commands to Graphics Accelerator 200, and these commands may be executed and rendered into the corresponding frame-buffer of the other Virtual Machine. Thus, when Host 100's operator indicates a desire to switch the Focus VM to another Virtual Machine (e.g., by switching Input Device 180 from VM 110 to VM 120), the other Virtual Machine becomes the Focus VM and Active GTT 240 may represent the contents of GTT 220. The process described above may be repeated to ensure that VM 120's output remains displayed on Display Device 170.

Figure 3:
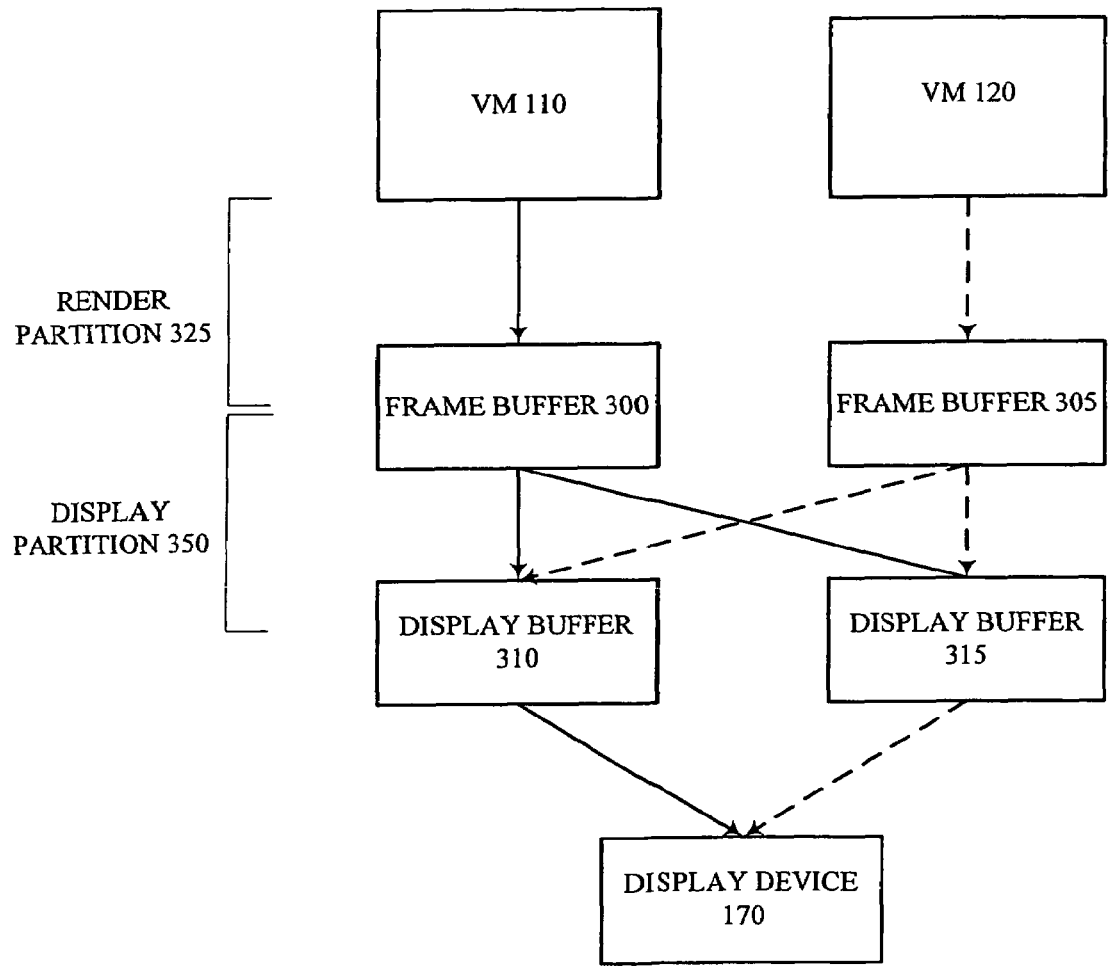
FIG. 3 illustrates conceptually an embodiment of the present invention.

FIG. 3 illustrates conceptually an embodiment of the present invention. The two logical partitions of Graphics Accelerator 200 are shown conceptually as Render Partition 325 and Display Partition 350. Display Buffer 310 and Display Buffer 315 are copies of Frame Buffer 300 and Frame Buffer 305 respectively, depending on whether VM110 or VM120 is the Focus VM. The solid line arrows in FIG. 3 illustrate that VM 110 is the current Focus VM and that the output of VM 110 may be written to Display Frame Buffer 310. In one embodiment, the PTEs representing the contents of Frame Buffer 300 may be copied to Display Buffer 310 (i.e., an unused area of VM 110's memory, at a predetermined offset from the location of Frame Buffer 300) and to Display Buffer 315 (in an unused area of VM 120's memory, different from the location of Frame Buffer 305, at the same predetermined offset as Display Buffer 310). The contents of Display Buffer 310 and 315 may then be displayed on Display Device 170. In one embodiment, since both display buffers point to the same content, the output from Display Buffer 310 and Display Buffer 315 to Display Device 170 may remain the same, i.e., the contents of Frame Buffer 300.

The dotted line arrows in FIG. 3 illustrate that although VM 110 may be the Focus VM, VM 120 may continue generating instructions and changes to the contents of Frame Buffer 305. In other words, VM 120 continues to have access to Graphics Accelerator's processing capabilities according to some allocation scheme. The contents of Frame Buffer 305, however, are not displayed on Display Device 170 until and unless Host 100's operator makes VM 120 the Focus VM. Thereafter, the process described above may be repeated to ensure that VM 120's output remains displayed on Display Device 170.

Although described above only in terms of frame-buffers, embodiments of the present invention may also be practiced with various other types of overlay buffers (e.g., cursor planes and/or video playback buffers) to ensure that only those of the Focus VM are displayed on Display Device 170. Overlay buffers are typically separate display buffers that allow graphics to be layered on top of a main frame buffer. An example of an overlay buffer is a video playback buffer that displays the contents of a movie.

Figure 4:
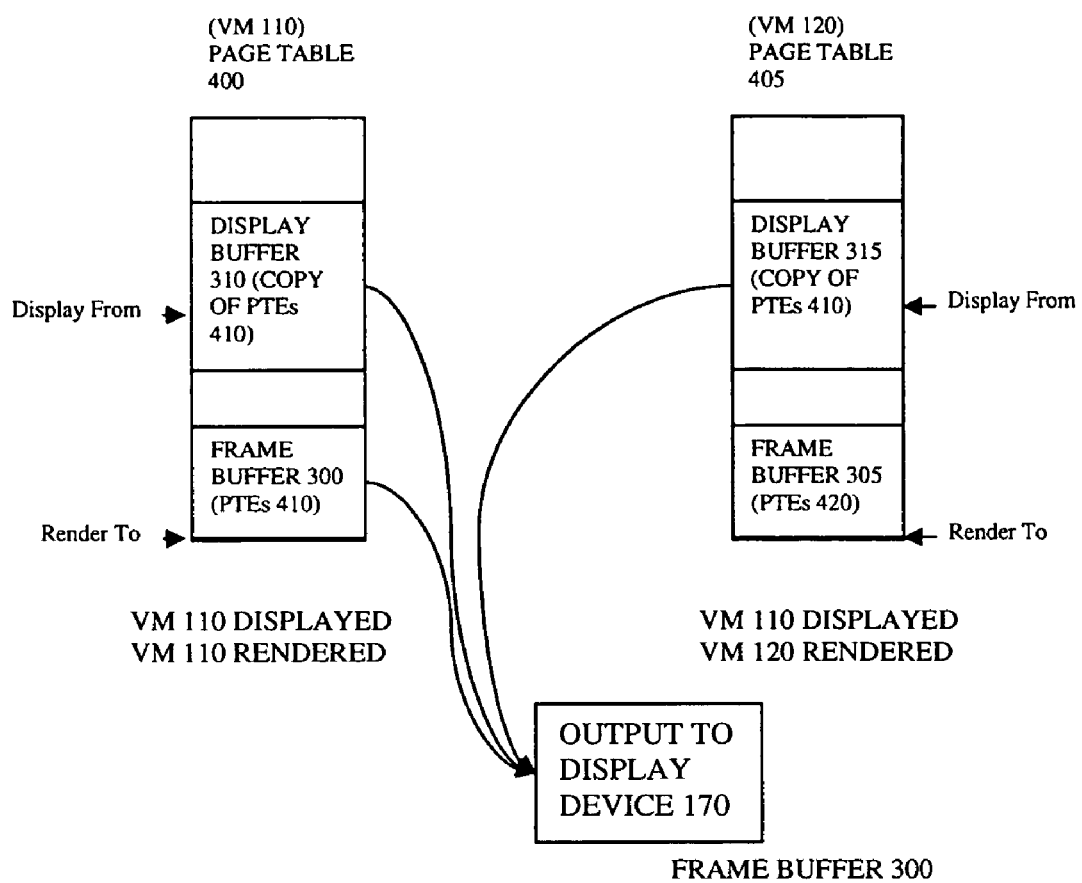
FIG. 4 illustrates the memory mapping of FIG. 3 in further detail.
Figure 5:
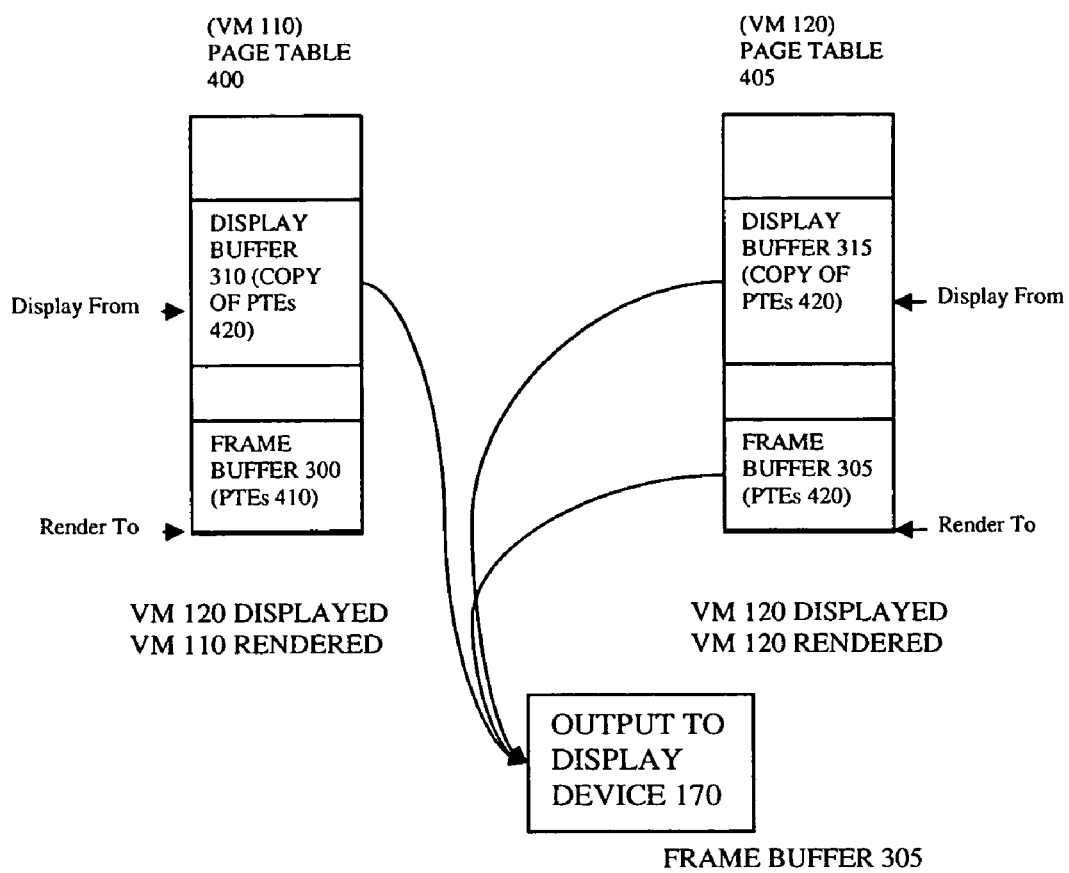
FIG. 5 illustrates the memory mapping of FIG. 3 in further detail.

FIG. 4 and FIG. 5 illustrate further an embodiment of the present invention. More specifically, FIG. 4 illustrates the memory mapping that occurs when VM 110 is the Focus VM while FIG. 5 illustrates the same when VM 120 is the Focus VM. In FIG. 4, Page Table 400 represents the page table defining the contiguous view of the graphics memory allocated to the graphics driver in Guest OS 111 on VM 110, while Page Table 405 represents the page table defining the contiguous view of the graphics memory allocated to Guest OS 121 on VM 120. Page Table 400 includes PTEs for VM 110 ("PTEs 410") and Page Table 405 includes PTEs for VM 120 ("PTEs 420"). When VM 110 is the Focus VM, VM 110 renders its output to Frame Buffer 300 within Page Table 400. PTEs 410 (defining the contents of Frame Buffer 300) may also be copied to define Display Buffer 310 in a different location in Page Table 400 and to define Display Buffer 315 in Page Table 405.

As previously described, Display Buffer 310 and Display Buffer 315 may be located at the same offset in the GTT for the respective Virtual Machines. The contents of Frame Buffer 300 (i.e., the buffer defined by PTEs 410) may thereafter be accessible at three different locations, i.e., Display Buffer 310, Display Buffer 315 and Frame Buffer 300 to which VM 110 continues to render. Since Display Buffer 310 and Display Buffer 315 point to the same content, regardless of which Virtual Machine is currently displaying output on Display Device 170, the output remains the same.

Throughout the process described above, Graphics Accelerator 200 may continue to render output for VM 120 to Frame Buffer 305 as defined by Page Table 405. Thus, as illustrated in FIG. 5, when Host 100's operator switches the Focus VM from VM 110 to VM 120, the contents of Frame Buffer 305 accurately represent the current graphics processing state of VM 120. In order to ensure the accurate content is displayed on Display Device 170, PTEs 420 (defining the contents of Frame Buffer 305) may be copied to create Display Buffer 315 at a different location in Page Table 405 and to create Display Buffer 310 in Page Table 400. The output to Display Device 170 may therefore remain that of VM 120 since both display buffers point to the same content in Frame Buffer 305.

Figure 6:
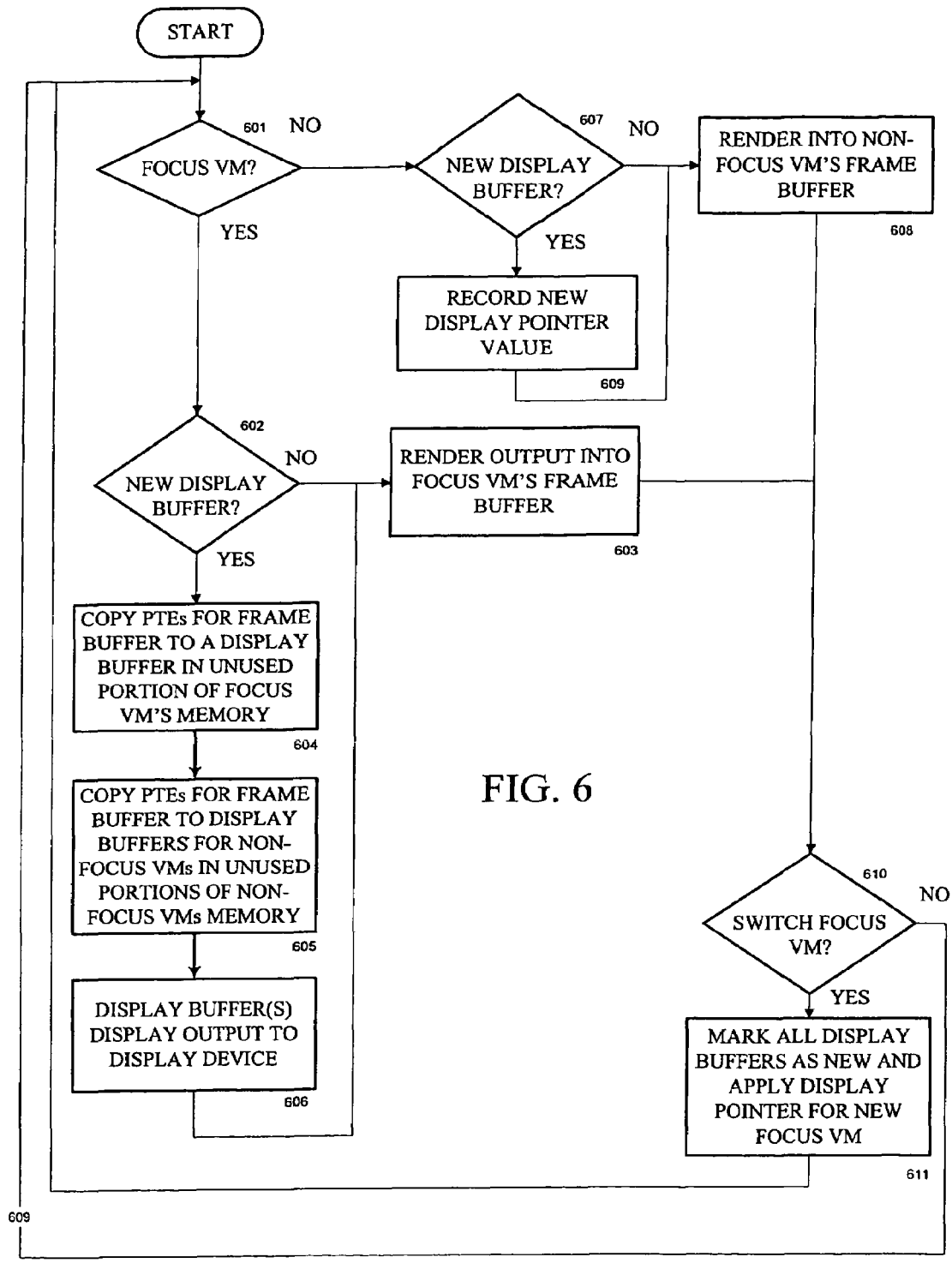
FIG. 6 is a flowchart illustrating an embodiment of the present invention.

FIG. 6 is a flow chart illustrating an embodiment of the present invention. Although the following operations may be described as a sequential process, many of the operations may in fact be performed in parallel and/or concurrently. In addition, the order of the operations may be re-arranged without departing from the spirit of embodiments of the invention. In 601, Enhanced VMM 230 may examine a VM to determine if it is a Focus VM (e.g., by examining whether the VM has human interface devices coupled to it or by any other pre-defined method). If the VM is a Focus VM, in 602, Enhanced VMM 230 may examine the display buffer to determine if it is a new display buffer. If it is not a new display buffer, in 603, the Focus VM may render its output to a frame-buffer location in graphics memory corresponding to the Focus VM. A GTT may include PTEs describing the mapping between the graphics memory space and host physical addresses on Host 100.

If the frame buffer is a new frame buffer, in 604, the PTEs defining the new frame buffer may be copied to define a new display buffer in an unused portion of the Focus VM's graphics memory. The display buffer may be located at a predetermined offset in the graphics memory. Additionally, in 605, the PTEs may be copied to create a display buffer in each of the non-Focus VMs' graphics memory at the same predetermined offset. In 606, the display buffers for the Focus VM and non-Focus VMs may display their output to a display device. Since all the display buffers point to the same content in the Focus VMs frame-buffers, the output on the display device may remain unchanged until Host 100's operator selects a new Focus VM in 610.

If in 601 the VM is identified as a non-Focus VM, Enhanced VMM 230 may nonetheless examine the display buffer in 607 to determine if it is a new display buffer. If it is not a new display buffer, then in 608, the non-Focus VMs may render output to their respective frame buffers in graphics memory. If, however, the display buffer is a new display buffer, the new display pointer values may also be recorded in 609. This process may continue until the Focus VM is switched in 610. Upon identifying a switch in the Focus VM, Enhanced VMM 230 may mark all display buffers as new in 611, and the process may be repeated.

The hosts according to embodiments of the present invention may be implemented on a variety of computing devices. According to an embodiment of the present invention, computing devices may include various components capable of executing instructions to accomplish an embodiment of the present invention. For example, the computing devices may include and/or be coupled to at least one machine-accessible medium. As used in this specification, a "machine" includes, but is not limited to, any computing device with one or more processors. As used in this specification, a machine-accessible medium includes any mechanism that stores and/or transmits information in any form accessible by a computing device, the machine-accessible medium including but not limited to, recordable/non-recordable media (such as read-only memory (ROM), random-access memory (RAM), magnetic disk storage media, optical storage media and flash memory devices), as well as electrical, optical, acoustical or other form of propagated signals (such as carrier waves, infrared signals and digital signals).

According to an embodiment, a computing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller (e.g., Graphics Accelerator 200), and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices (e.g., Input Device 180) may be included in the computing device for providing input data and a display device (e.g., Display Device 170) may be coupled to the USB to enable output to be displayed. In alternate embodiments, the host bus controller may be compatible with various other interconnect standards including PCI, PCI Express, FireWire and/or other such existing and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for enabling multiple virtual machines ("VMs") on a host to share a graphics device, the method comprising:

identifying a first VM to display output on a display device, the identified first VM to be considered a focus VM;

storing output for the first VM in a first frame buffer associated with the first VM;

creating a first display buffer associated with the first VM by copying page table entries (PTEs) that point to the first frame buffer, the first display buffer located at a predetermined offset;

creating a second display buffer associated with a second VM by copying the PTEs that point to the first frame buffer, the second display buffer located at the predetermined offset;

rendering display of the second VM, when required, in a second frame buffer associated with the second VM;

displaying contents of the first frame buffer by utilizing the PTEs in the first display buffer, when the first VM is active, and utilizing the PTEs in the second display buffer associated with the second VM, when the second VM is active, thereby continuing to display the first frame buffer associated with the focus VM;

switching the focus VM from the first VM to the second VM to display output from the second VM on the display device;

storing rendered output for the second VM in a the second frame buffer associated with the second VM;

copying PTEs that point to the second frame buffer to the first display buffer and the second display buffer; and displaying the contents of the second frame buffer by utilizing the PTEs in the first display buffer, when the first VM is active, and utilizing the PTEs in the second display buffer associated with the second VN, when the second VM is active, thereby continuing to display the second frame buffer associated with the focus VM.

2. The method according to claim 1 wherein creating the first display buffer and the second display buffer further comprises copying the PTEs into a Graphics Translation Table from the first frame buffer.

3. The method according to claim 1 wherein copying the PTEs that point to the first display buffer and the second display buffer further comprises copying the PTEs in a Graphics Translation Table from the second frame buffer.

4. The method according to claim 1 wherein identifying the first VM further comprises identifying a VM currently selected to display output on a display device.

5. The method according to claim 4 wherein switching from the first VM to the second VM further comprises identifying a new VM to display output on the display device.

6. The method according to claim 5 wherein identifying the VM currently selected to display further comprises identifying the VM that is currently associated with an input device.

7. The method according to claim 6 wherein switching from the first VM to the second VM further comprises dissociating the user input device from the first VM and associating the user input device with the second VM.

8. The method according to claim 5 wherein identifying the VM currently selected to display further comprises identifying the VM associated with a selected frame buffer.

9. The method according to claim 1 wherein the first display buffer is located at an unused location in a first memory associated with the first VM and the second display buffer is located at an unused location in a second memory associated with the second VM.

10. The method according to claim 1 further comprising:
associating an overlay buffer with the first VM; and
layering the contents of the overlay buffer over the contents of the first frame buffer to display a blended content on the display device.

11. The method according to claim 10 wherein the overlay buffer includes one of a cursor plane and a video playback buffer.

12. A computer system for sharing a graphics device amongst virtual machines ("VMs"), comprising:
a virtual machine manager ("VMM");
a display device coupled to the VMM;
a focus VM coupled to the VMM and the display device, the focus VM displaying output on the display device;
a first frame buffer associated with the focus VM for storing output for the focus VM;
a first display buffer associated with the focus VM, the first display buffer located at a predetermined offset and created by copying page table entries (PTEs) that point to the first frame buffer;
a non-focus VM coupled to the VMM and the display device;
a second display buffer associated with the non-focus VM, the second display buffer located at the predetermined offset and created by copying the PTEs that point to the first frame buffer, wherein the second display buffer stores rendered graphics of the non-focus VM without being displayed,
the VMM configured to ensure the contents of the first frame buffer are displayed on the display device by utilizing the PTEs in the first display buffer, when the focus VM is active, and the PTEs in the second display buffer when the non-focus VM is active, the VMM further configured to copy page table entries pointing to the second frame buffer to both the first and second display buffers in response to a request to make the non-focus VM become a new focus VM in conjunction with the focus VM becoming a new non-focus VM, thereby ensuring that display data sent to the display device is associated with the new focus VM.

13. The system according to claim 12 wherein the first display buffer and the second display buffer comprise copies of the PTEs in a Graphics Translation Table from the first frame buffer.

14. The system according to claim 12 wherein the focus VM comprises a VM currently selected to display output on a display device.

15. The system according to claim 14 wherein the VM currently selected to display further comprises the VM that is currently associated with an input device.

16. The system according to claim 14 wherein the VM currently selected to display further comprises the VM associated with a selected frame buffer.

17. The system according to claim 12 wherein the first display buffer is located at an unused location in a first memory associated with the focus VM and the second display buffer is located at an unused location in a second memory associated with the non-focus VM.

18. The system according to claim 12 further comprising:
an overlay buffer associated with the focus VM, the VMM capable of layering contents of the overlay buffer over the contents of the first frame buffer to display a blended content on the display device.

19. An article comprising a machine-accessible medium having stored thereon instructions that, when executed by a machine, cause the machine to share a graphics device by:
identifying a first VM to display output on a display device, the identified first VM to be considered a focus VM;
storing output for the first VM in a first frame buffer associated with the first VM;
creating a first display buffer associated with the first VM by copying page table entries (PTEs) that point to the first frame buffer, the first display buffer located at a predetermined offset;
creating a second display buffer associated with a second VM by copying the PTEs that point to the first frame buffer, the second display buffer located at the predetermined offset;
rendering display of the second VM, when required, in a second frame buffer associated with the second VM;
displaying the contents of the first frame buffer to the display device by utilizing the PTEs in the first display buffer, when the first VM is active, and utilizing the PTEs in the second display buffer associated with the second VM, when the second VM is active, thereby continuing to display the first frame buffer associated with the focus VM;
switching the focus VM from the first VM to the second VM to display output from the second VM on the display device;
storing rendered output for the second VM in a the second frame buffer associated with the second VM;
copying PTEs that point to the second frame buffer to the first display buffer and the second display buffer; and
displaying the contents of the second frame buffer by utilizing the PTEs in the first display buffer, when the first VM is active, and utilizing the PTEs in the second display buffer associated with the second VN, when the second VM is active, thereby continuing to display the second frame buffer associated with the focus VM.

20. The article according to claim 19 wherein the instructions when executed by the machine, cause the machine to create the first display buffer and the second display buffer by copying the PTEs into a Graphics Translation Table from the first frame buffer.

21. The article according to claim 19 wherein the instructions, when executed by the machine, further cause the machine to create copies of the second frame buffer to the first display buffer and the second display buffer by copying the PTEs in a Graphics Translation Table from the second frame buffer.

22. The article according to claim 19 wherein the instructions, when executed by the machine, further cause the machine to identify the first VM by identifying a VM currently selected to display output on a display device.

23. The article according to claim 22 wherein the instructions, when executed by the machine, further cause the machine to switch from the first VM to the second VM by identifying a new VM to display output on the display device.

24. The article according to claim 22 wherein the instructions, when executed by the machine, further cause the machine to identify the VM currently selected to display by identifying the VM that is currently associated with an input device.

25. The article according to claim 24 wherein the instructions, when executed by the machine, further cause the machine to switch from the first VM to the second VM by dissociating the user input device from the first VM and associating the user input device with the second VM.

26. The article according to claim 22 wherein the instructions, when executed by the machine, further cause the machine to identify the VM currently selected to display by identifying the VM associated with a selected frame buffer.

27. The article according to claim 22 wherein the instructions, when executed by the machine, further cause the machine to share the graphics device by:
 associating an overlay buffer with the first VM; and
 layering the contents of the overlay buffer over the contents of the first frame buffer to display a blended content on the display device.

28. The article according to claim 27 wherein the overlay buffer includes one of a cursor plane and a video playback buffer.

* * * * *